(12) United States Patent
Apperger (10) Patent No.: US 11,353,120 B2
(45) Date of Patent: Jun. 7, 2022

(54) REGULATING DEVICE FOR PUMP PRESSURE AND PUMP VOLUMETRIC FLOW RATE, HAVING CONCENTRIC CONTROL SLIDE VALVES

(71) Applicant: Robert Bosch GmbH, Stuttgart (DE)

(72) Inventor: Andreas Apperger, Eutingen (DE)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 16/576,479

(22) Filed: Sep. 19, 2019

(65) Prior Publication Data

US 2020/0103037 A1 Apr. 2, 2020

(30) Foreign Application Priority Data

Oct. 1, 2018 (DE) ...................... 10 2018 216 831.8

(51) Int. Cl.
*F16K 3/24* (2006.01)
*F04B 49/00* (2006.01)
*F16K 31/122* (2006.01)

(52) U.S. Cl.
CPC ............ *F16K 3/246* (2013.01); *F04B 49/002* (2013.01); *F16K 31/1221* (2013.01)

(58) Field of Classification Search
CPC .. F16K 31/426; F16K 31/1221; F16K 27/041; F16K 11/0716; F15B 2211/20553; F15B 13/0403; Y10T 137/87169; Y10T 137/86606; F04B 49/002
See application file for complete search history.

(56) References Cited

U.S. PATENT DOCUMENTS

| | | | |
|---|---|---|---|
| 2,502,800 A * | 4/1950 | Renick ................. | F15B 13/0403 91/420 |
| 2,619,118 A * | 11/1952 | Adams ................. | F15B 13/0403 137/625.68 |
| 3,980,011 A * | 9/1976 | Hermans ............... | F16K 41/003 99/453 |
| 4,526,201 A * | 7/1985 | Geyler, Jr. .......... | F15B 13/0403 137/625.63 |
| 6,481,463 B1 * | 11/2002 | Harms ..................... | F15B 9/10 137/625.65 |

(Continued)

FOREIGN PATENT DOCUMENTS

| | | |
|---|---|---|
| DE | 199 53 170 B4 | 5/2001 |
| EP | 0 402 871 B1 | 12/1990 |
| EP | 1 409 873 B1 | 4/2004 |

*Primary Examiner* — Reinaldo Sanchez-Medina
*Assistant Examiner* — Nicole Gardner
(74) *Attorney, Agent, or Firm* — Maginot, Moore & Beck, LLP (57) ABSTRACT

A regulating device for use with a pump that has a hydraulically adjustable displacement volume, wherein the regulating device includes an inflow port, a return flow port, an actuating port, a control port, a first control slide valve, and a second control slide valve. The first control slide valve is linearly movable with respect to a center axis, the first control slide valve defining first and second orifices, which are adjustable jointly and in opposite directions. The second control slide valve is linearly movable and defines third and fourth orifices, which are adjustable jointly and in opposite directions. The second control slide valve is accommodated in a linearly movable manner within the first control slide valve.

14 Claims, 3 Drawing Sheets

(56) References Cited

U.S. PATENT DOCUMENTS

| | | | |
|---|---|---|---|
| 2010/0301248 A1* | 12/2010 | Yamamoto | F15B 13/0417 251/129.15 |
| 2013/0126766 A1* | 5/2013 | Haupt | F15B 13/0403 251/28 |
| 2014/0147298 A1* | 5/2014 | Diebold | F03C 1/0686 417/222.1 |
| 2015/0330271 A1* | 11/2015 | Lappan | F01M 1/16 137/625.48 |

* cited by examiner

REGULATING DEVICE FOR PUMP PRESSURE AND PUMP VOLUMETRIC FLOW RATE, HAVING CONCENTRIC CONTROL SLIDE VALVES

This application claims priority under 35 U.S.C. § 119 to application no. DE 10 2018 216 831.8, filed on Oct. 1, 2018 in Germany, the disclosure of which is incorporated herein by reference in its entirety.

The disclosure relates to a regulating device.

BACKGROUND

From EP 1 409 873 B1, a regulating device for a pump with adjustable displacement volume is known. This has a first and a second control slide valve, which are arranged side by side. The regulating device is designed such that, on the one hand, a pressure at an inflow port can be regulated, while, at the same time, a volume flow via a metering orifice or a drop in pressure at the metering orifice can be regulated.

SUMMARY

An advantage of the present disclosure consists in the fact that the known regulating behavior can be achieved with a considerably smaller regulating device. The regulating device is in particular configured so compactly that it can be constructed in the form of a screw-in valve. Consequently, the entire servo unit consisting of the regulating device and an actuating piston can be constructed in the style of a cartridge.

According to the disclosure, it is proposed that the second control slide valve is accommodated in a linearly movable manner within the first control slide valve. In a particularly preferred embodiment, a fifth and a sixth orifice are provided, wherein a first fluid flow path runs from the actuating pressure port, via the fifth orifice, onward via a control region, onward via the sixth orifice, to the return flow port, wherein a second fluid flow path runs from the actuating pressure port, via the second orifice, onward via the control region, onward via the fourth orifice, to the return flow port, wherein the control region is formed, at least in some sections, by a cavity within the second control slide valve.

The control region is here preferably constituted by a continuous spatial region, in which the same pressure prevails everywhere. This spatial region comprises, in particular, no adjustable orifices whose opening cross section can be adjusted small. As emerges, in particular, from the following comments relating to FIG. 2, the control region, in the present regulating device, has a central function. In EP 1 409 873 B1, the control region is arranged fully in the valve housing, whereby a very large amount of installation space is required.

The first and/or the second and/or the third and/or the fourth orifice are preferably steplessly adjustable. The fifth and/or the sixth orifice preferably have a constant flow resistance. The second control slide valve is preferably linearly movable with respect to the center axis. The second control slide valve is preferably subjected to the pressure at the control port in the direction of an enlargement of the fourth orifice. The inflow port can be connectable via the first orifice to the actuating pressure port. The inflow port can be connectable via the third orifice to the control region. The pressure at the inflow port can impinge on the first control slide valve in the direction of a diminution of the second orifice. The pressure at the inflow port can impinge on the second control slide valve in the direction of a diminution of the fourth orifice. The first control slide valve can be pressurized by a first spring in the direction of an enlargement of the second orifice. The second control slide valve can be pressurized by a second spring in the direction of an enlargement of the fourth orifice. The axial piston machine can be configured such that its displacement volume diminishes when the pressure at the actuating pressure port increases.

It can be provided that the first control slide valve is set up such that the pressure at the inflow port can be regulated to a predefined value, and/or wherein the second control slide valve is set up such that the difference between the pressure at the inflow port and the pressure at the control port can be regulated to a predefined value.

It can be provided that the regulating device is configured in the form of a screw-in valve, which is screwable, with respect to the center axis, into a pump housing, wherein the first and the second control slide valve are arranged coaxially to the center axis, wherein the control port is arranged on an end face, facing in the direction of the center axis, of the regulating device. A regulating device of this type requires particularly little space. At the same time, the control port is particularly easily accessible for the user of the regulating device to enable pressure lines, in particular hoses or pipes, to be connected there.

A separate pressure piece, which can be brought into touching contact with the second control slide valve and is movable collinearly therewith, can be provided, wherein the pressure piece delimits a control pressure space, in which the pressure at the control port obtains. As a result, tensions within the regulating device, which would hinder its mobility, can be avoided. This applies, in particular, where a valve housing comprises a first and a separate second housing part, wherein the pressure piece is accommodated in the second housing part, while the first and the second control slide valve are accommodated in the first housing part.

It can be provided that in the control pressure space is arranged a second spring, which is supported against the pressure piece. The second spring is preferably supported, on the side facing away from the pressure piece, against a spring bearing, the position of which is steplessly adjustable in the direction of the center axis. The counter bearing is preferably formed by at least one screw, which is most preferably traversed in the direction of the center axis by at least one fluid channel. Thus, the preload of the second spring is adjustable.

A first housing part, in which the first control slide valve is accommodated in a linearly movable manner, can be provided, wherein a second housing part, which is screwed into the first housing part in such a way that the relative position between first and second housing part is adjustable with respect to the center axis, wherein a first spring is accommodated between the first control slide valve and the second housing part. Thus, the preload of the first spring is adjustable. The second spring is preferably accommodated under preload between the first control slide valve and the second housing part. The first control slide valve preferably has a flange, against which the first spring is supported. Preferably a lock nut is provided, with which the first and the second housing part can be clamped together. The first and the second orifice are preferably, in some sections, delimited by the first housing part.

It can be provided that the pressure piece is accommodated in a linearly movable manner in the second housing part. The control pressure space is preferably, in some sections, delimited by the second housing part.

It can be provided that the control region comprises a cavity in the second control slide valve, which cavity extends, in the direction of the center axis, at least from the third up to the fourth orifice. Thus, the control region can be led in a simple and space-saving manner into the direct vicinity of the third and the fourth orifice.

It can be provided that the second control slide valve has a plurality of first radial bores, which are a component part of the control region and via which the cavity is fluidically connected to the first control slide valve. Thus, the control region can be led in a simple and space-saving manner into the direct vicinity of the third and the fourth orifice.

It can be provided that the third and the fourth orifice are delimited, in some sections, by the first control slide valve in such a way that their opening cross section is dependent on the relative position between the first and the second control slide valve in the direction of the center axis. The desired adjustability of the third and fourth orifice can hence be realized in a simple manner.

It can be provided that the first control slide valve has a plurality of second radial bores, wherein at least one second radial bore is a component part of the control region. At least one further second radial bore can be a component part of the third orifice. At least one further second radial bore can be a component part of the fourth orifice.

It can be provided that the fifth and/or the sixth orifice are arranged in a valve housing, in which the first control slide valve is accommodated in a linearly movable manner. The fifth and/or the sixth orifice are preferably arranged in the first housing part.

It can be provided that between the first control slide valve and a valve housing is provided, in some sections, a gap, which extends from an end, facing in the direction of the center axis, of the first control slide valve up to the first orifice, wherein the inflow port is fluidically connected to the gap. It can hereby be achieved that the pressure at the inflow port impinges on the first and/or the second control slide valve in the direction of the center axis. Away from the gap, the first control slide valve is preferably adapted in a substantially fluid-tight manner to the valve housing.

It can be provided that the control region is respectively delimited, in some sections, by the first and by the second control slide valve and by a valve housing.

Self-evidently, the above-stated features and the features yet to be set out below are usable not only in the respectively stated combination, but also in other combinations or in isolation, without departing from the scope of the present disclosure.

BRIEF DESCRIPTION OF THE DRAWINGS

The disclosure is explained in greater detail below with reference to the accompanying drawings, in which.

DETAILED DESCRIPTION

Figure 1:
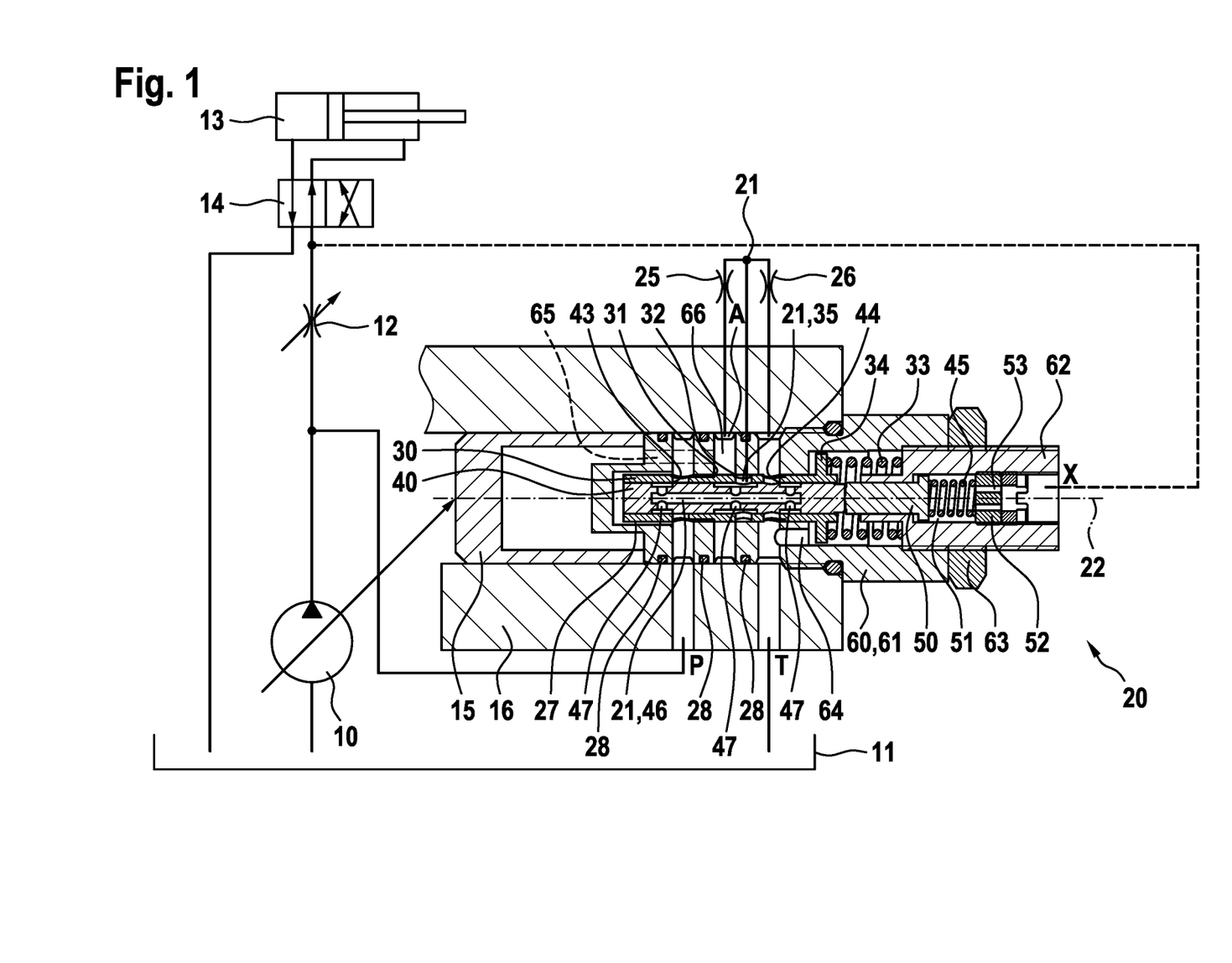
FIG. 1 shows a roughly schematic longitudinal section of a regulating device according to the disclosure according to a first embodiment and an associated pump.

FIG. 1 shows a roughly schematic longitudinal section of a regulating device 20 according to the disclosure according to a first embodiment, and of an associated pump 10. The pump 10 has an adjustable displacement volume, wherein this can here be constituted, for instance, by an axial piston pump in a swash plate design or bent axis design. The pump 10 sucks up pressure fluid from a tank 11 and delivers it, via a steplessly adjustable metering orifice 12 and a directional valve 14, to an actuator 13. The pressure fluid is here preferably constituted by a liquid, and most preferably by hydraulic oil. The actuator 13 can here be constituted by a cylinder or a hydraulic motor. With the directional valve 14, the motional direction of the actuator 13 is set. The metering orifice 12 is preferably integrated in the directional valve 14, while it is represented separately purely for the sake of clarity. The pressure fluid flowing back from the actuator 13 is conducted via the directional valve 14 to the tank 11.

By means of the regulating device 20, the displacement volume of the pump 10 is set such that the drop in pressure at the metering orifice 12 has a substantially constant, predefined value. Ultimately, the motional velocity of the actuator 13 is substantially solely dependent on the setting of the metering orifice 12, regardless of what load is acting on the actuator 13. Furthermore, the delivery pressure of the pump 10 is regulated. The hydraulic functioning of the regulating device 20 is explained in greater detail with reference to FIG. 2.

The pump 10 comprises a pump housing 16, into which the regulating device 20, which is configured in the style of a screw-in valve, is screwed. The corresponding receiving bore here forms at the same time a cylinder bore, in which an actuating piston 15 of pot-like configuration is accommodated in a linearly movable manner with respect to a center axis 22. The actuating piston 15 is motionally coupled to the adjustment mechanism of the pump 10, for instance to the swash plate.

The regulating device 20 has a valve housing 60, which is composed of a first and a second housing part 61; 62. The first housing part 61 is screwed into the pump housing 16. It forms on its outer peripheral surface an inflow port P, an actuating port A and a return flow port T, which are demarcated from one another by seals 28, wherein they are preferably configured in the form of circumferential grooves running around the center axis 22. Respectively via channels in the pump housing 16, the inflow port P is connected to the pressure upstream of the metering orifice 12, and the return flow port T to the tank 11. Via an actuating channel 65, running parallel to the center axis, in the first housing part 61, the actuating port A is connected to the actuating chamber delimited by the actuating piston 15 and by the pump housing 16.

In the first housing part 61, a first control slide valve 30 is accommodated in a linearly movable manner with respect to the center axis 22. Within the first control slide valve 30, a second control slide valve 40 is accommodated in a linearly movable manner with respect to the center axis 22. The first control slide valve 30 forms on its outer periphery a first and a second steplessly choice 31; 32. To this end, it is provided with circumferential grooves running around the center axis, which form control edges for the first and the second orifice 31; 32. The third radial bore 66 in the first housing part 61, which radial bore is connected to the actuating port A, forms the counterpart to said control edges. In the middle position represented in FIG. 1, the first and the second orifice 31; 32 are closed off. When the first control slide valve 30 in FIG. 1 is moved to the right toward the control port X, the opening cross section of the first orifice 31 enlarges, whereupon the second orifice 32 remains closed off. Upon a movement in the opposite direction, the opening cross section of the second orifice 32 enlarges, whereupon the first orifice 31 remains closed off.

On the outer periphery of the second control slide valve 40 are arranged the third and the fourth orifice 43; 44. The corresponding control edges are formed by circumferential grooves, running around the center axis 22, on the second control slide valve 40, which grooves cooperate with respectively associated second radial bores 35 in the first control slide valve 30. The opening cross section of the third and fourth orifice 43; 44 is accordingly dependent on the relative position between first and second control slide valve with respect to the center axis 22. In the middle position represented in FIG. 1, the third and the fourth orifice 43; 44 are totally closed. When the second control slide valve 40 is moved toward the control port X, the third orifice 43 opens, whereupon the fourth orifice 44 remains closed off. When the second control slide valve 40 is moved away from the control port X, the fourth orifice 44 opens, whereupon the third orifice 43 remains closed off.

At that end of the first control slide valve 30 that is facing away from the control port X, a gap 27 is arranged between the first control slide valve 30 and the first housing part 61. This gap connects the inflow port P to those end faces of the first and second control slide valve 30; 40 that are facing away from the control port X. The first control slide valve 30 is accordingly pressurized by the pressure at the inflow port P in the direction of an enlargement of the first orifice 31. In the opposite direction, the first control slide valve 30 is pressurized by a first spring 33, which is installed under preload between a flange 34 on the first control slide valve 30 and the second housing part 62. The preload is adjustable by alteration of the screw-in depth of the second housing part 62 in the first housing part 61. This adjustment can be secured with the lock nut 63. The space in which the first spring 33 is accommodated is connected via the pressure relief channel 64 to the return flow port T, so that substantially no pressure is present there.

The second control slide valve 40 is pressurized by the pressure at the inflow port P in the direction of an enlargement of the third orifice 43. In the opposite direction, it is pressurized by the force of a second spring 45, which, via a separate pressure piece 50, acts on the second control slide valve 40. The pressure piece 50 is accommodated in a linearly movable manner in the second housing part 62 in the direction of the center axis 22. The corresponding guide gap here also seals off the control pressure space 51, in which the second spring 45 is accommodated, in a substantially fluid-tight manner from the space in which the first spring 33 is accommodated. The pressure piece 50 is in direct touching contact, in the direction of the center axis 22, with the second control slide valve 40, wherein, moreover, no motional coupling between these two parts is given. Consequently, small misalignments between second control slide valve 40 and pressure piece 50 cannot lead to tensions which will hinder the mobility of the regulating device 20.

The second spring 45 is installed under preload between the pressure piece 50 and a counter bearing 52. The counter bearing 52 is screwed into the second housing part 62, wherein, by alteration of the screw-in depth, the preload of the second spring 45 is adjustable. The counter bearing 52 comprises two separate screws, which can be clamped one against the other, so that said adjustment can be secured. The counter bearing 52 is traversed in the direction of the center axis 22 by at least one fluid channel 53, so that the pressure at the control port X obtains in the control pressure space 51. It thus impinges on the pressure piece 50 in the direction of the center axis 22 and, indirectly, also the second control slide valve 40.

In addition, reference should be made to the symbolically represented fifth and sixth orifice 25; 26, which respectively have a constant flow resistance. They are preferably arranged in the first housing part 61.

Figure 2:
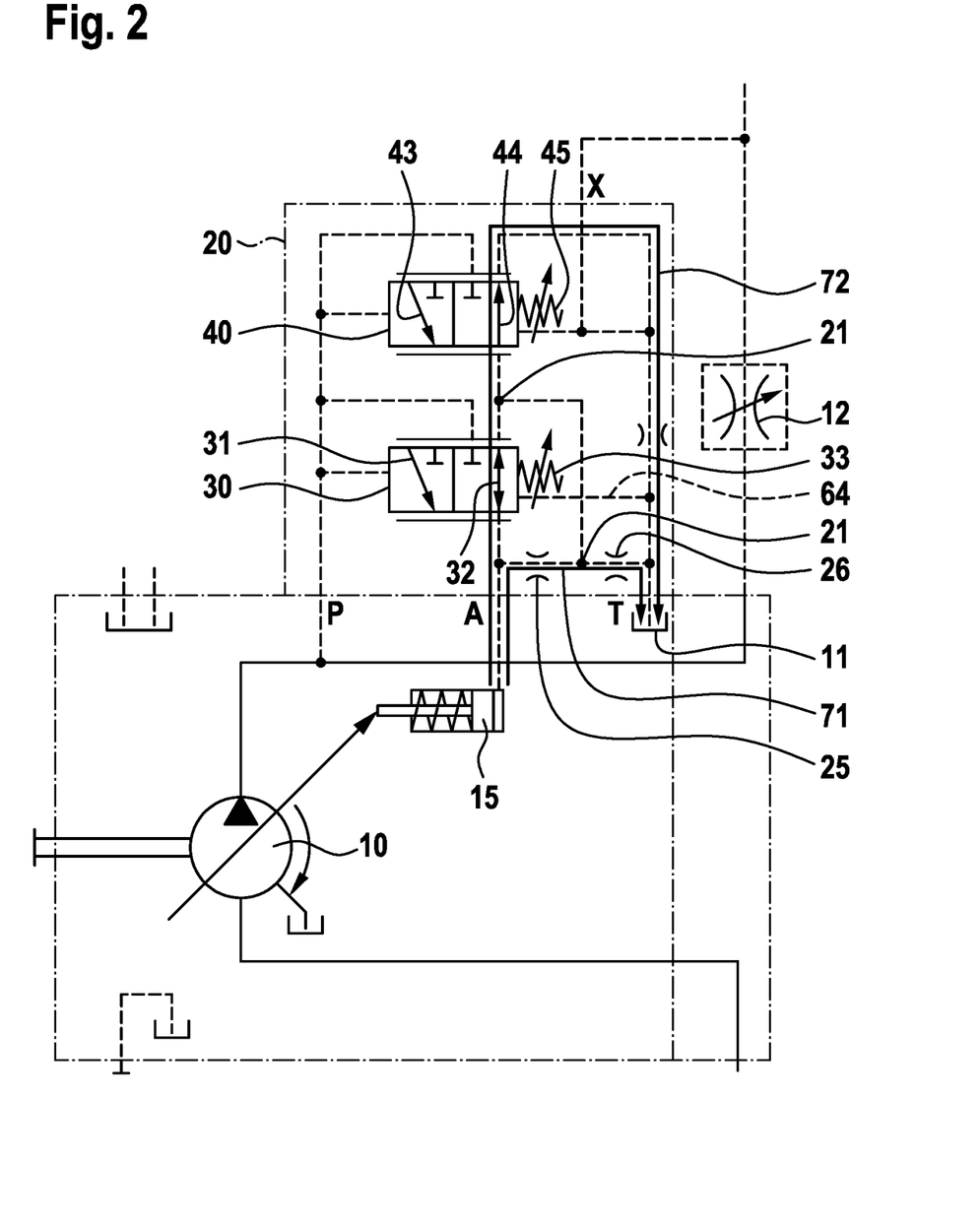
FIG. 2 shows a circuit diagram of the arrangement according to FIG. 1.

FIG. 2 shows a circuit diagram of the arrangement according to FIG. 1. This circuit diagram is incomplete insofar as it does not embrace a particularity of the arrangement according to FIG. 1. This consists in the fact that the opening cross sections of the third and fourth orifice 43; 44 are dependent on the relative position between first and second control slide valve 30; 40. In contrast, FIG. 2 conveys the misleading impression that said opening cross sections depend solely on the position of the second control slide valve 40. Otherwise it is an accurate representation of the arrangement according to FIG. 1, wherein, in particular the fluidic connections between the first to sixth orifice 31; 32; 43; 44; 25; 26 are represented in accordance with the actual circumstances.

Viewed in isolation, the first control slide valve 30 forms a conventional pressure regulator for a pump 10 with adjustable displacement volume. The pressure set value thereof is predefined by the setting of the first spring 33. Roughly speaking, the first control slide valve 30 brings the pressure at the inflow port P to approximate to the pressure equivalent of the first spring 33, insofar as these differ from one another.

This control setting is disturbed by the first fluid flow path 71. This runs from the actuating port A via the fifth orifice 25, onward via the control region 21, onward via the sixth orifice 26, to the return flow port T. It should herein be noted that the control region 21 is here constituted by a larger continuous spatial region, which is delimited, respectively in some sections, by the first and by the second control slide valve 30; 40 and by the valve housing. More particularly, the control region 21 comprises, inter alia, a cavity (no. 46 in FIG. 1) in the first control slide valve 30, the first radial bores (no. 47 in FIG. 1) in the first control slide valve 30, one of the second radial bores (no. 35 in FIG. 1) in the second control slide valve 40. Throughout the control region 21, substantially the same pressure prevails everywhere, to be precise irrespective of the setting in which the regulating device 20 is found. In FIG. 2, the control region 21 is accordingly represented as a simple connecting line, in which no orifices are arranged.

Via the first fluid flow path 71, pressure fluid persistently runs off from the actuating port A toward the tank 11. This disturbance is compensated by the first control slide valve 30. Since the first control slide valve 30 has an integral regulating behavior, it can fully compensate this disturbance.

Starting from the actuating pressure port A, a second fluid flow path 72 runs via the second orifice 32, onward via the control region 21, onward via the fourth orifice 44, to the return flow port T. The second control slide valve 40 is in FIG. 2 pressurized, from the left, solely by the pressure at the inflow port P. The pressure equivalent of the second spring 45 and the pressure at the control port X acts from the right. The pressure at the control port X is in turn equal to the pressure at the inflow port P, less the drop in pressure at the metering orifice 12. The pressure at the inflow port P thus obtains on both sides of the second control slide valve. In total, the position of the second control slide valve 40 is thus solely dependent on the pressure equivalent of the second spring 45 and on the drop in pressure at the metering orifice 12, but not on the pressure at the inflow port P. When the drop in pressure at the metering orifice 12 is greater than the pressure equivalent of the second spring 45, the second control slide valve in FIG. 2 moves to the right, whereby the pressure in the control region 21 rises. Otherwise, the pressure in the control region 21 falls.

The control region 21 forms at the same time the midpoint of the pressure divider formed by the fifth and the sixth orifice 25; 26. Moreover, the second fluid flow path 72 means that the pressure at the actuating port A can never fall below the pressure in the control region 21. The flow through the fifth orifice 25 thus runs always in the same direction toward the control region 21. The corresponding fluid flow is dependent on the difference between the pressure at the actuating pressure port A and the pressure in the control region 21.

When the pressure in the control region 21 rises, said fluid flow falls. From the first control slide valve 30, more pressure fluid runs to the actuating pressure port A than runs off via the first fluid flow path 71. The actuating piston 15 subsequently extends and reduces the displacement volume of the pump 10. As a result, the fluid flow through the metering orifice 12 falls, whereby a drop in pressure at the metering orifice 12 falls. Ultimately, the second control slide valve 40 means that the delivery rate of the pump 10 is set sufficiently high that the drop in pressure at the metering orifice 12 is equal to the pressure equivalent of the second spring 44.

In contrast, the first control slide valve 30 regulates the pressure at the inflow port P to the pressure equivalent of the first spring 33.

Figure 3:
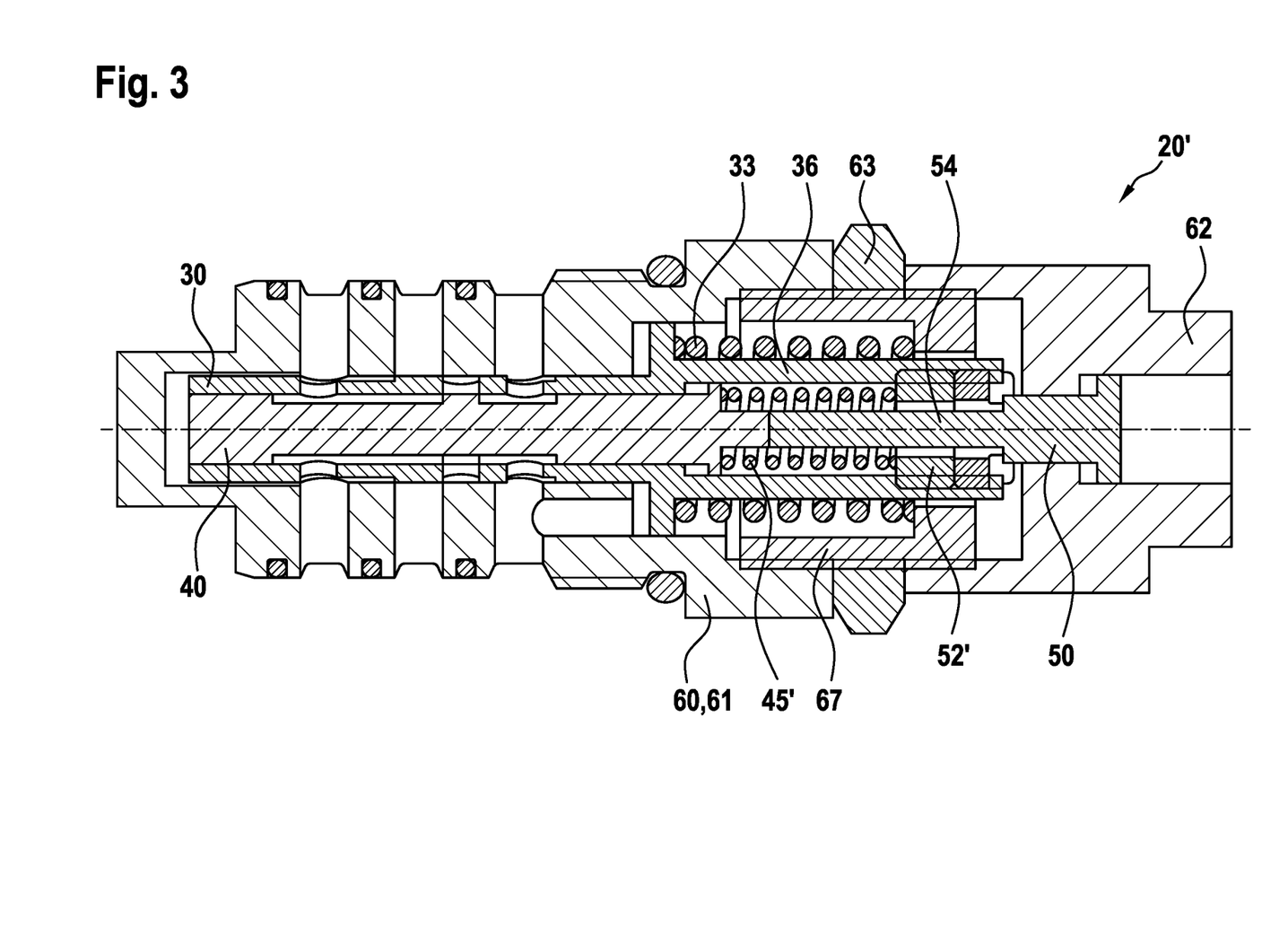
FIG. 3 shows a regulating device according to a second embodiment.

FIG. 3 shows a regulating device 20' according to a second embodiment. The second embodiment of the regulating device 20', apart from the differences described below, is constructed identically to the first embodiment 20, so that, in this respect, reference is made to the comments relating to FIGS. 1 and 2. In FIGS. 1 and 3, same or mutually corresponding parts are provided with the same reference numerals, while, in the case of a few parts, an apostrophe has been added.

The second embodiment 20' has been modified in relation to the first embodiment such that the circuit diagram according to FIG. 2 applies without any restriction. That particularity of the first embodiment that is explained with reference to FIG. 2 is no longer given. This has been achieved by virtue of the fact that the second spring 45' is no longer supported against the valve housing 60, but rather against the first control slide valve 30.

To this end, the first control slide valve 30 has been lengthened by a tubular portion 36. The counter bearing 52' for the second spring 45' is no longer screwed into the valve housing 60, but rather into the tubular portion 36. The counter bearing 52' and the associated lock nut are otherwise constructed identically to the first embodiment according to FIG. 1. The second spring 45' is accommodated within the tubular portion 36, wherein it is installed, under preload, between the second valve slide 40 and the counter bearing 52'.

The shape of the pressure piece 50 has been adapted correspondingly. It should herein be noted that the pressure piece 50 continues to be mounted in a linearly movable manner in the second housing part 62. The bearing has shifted further to the right, however, in relation to FIG. 1, so that the pressure piece has been correspondingly lengthened 45. The diameter of the lengthening 45 has been chosen such that the lengthening 45 passes through the second spring 45' with a clearance.

In relation to the first embodiment, the third housing part 67, moreover, has been added. The first spring 33 is no longer supported against the second housing part 62, but rather against a collar of the third housing part 67, which latter is of sleeve-like configuration. This has the advantage that the second housing part 62 with the pressure piece 50 can be disassembled without the preload setting of the first and second spring 33; 45' being altered. The third housing part 67 is here provided with an external thread, which is screwed into an internal thread on the first housing part 61. The position of the third housing part 67 is secured with a lock nut 63. The second housing part 62 is in turn clamped against the lock nut 63.

REFERENCE SYMBOLS

P inflow port
T return flow port
A actuating port
X control port
10 pump
11 tank
12 metering orifice
13 actuator
14 directional valve
15 actuating piston
16 pump housing
20 regulating device (first embodiment)
20' regulating device (second embodiment)
21 control region
22 center axis
25 fifth orifice
26 sixth orifice
27 gap
28 seal
30 first control slide valve
31 first orifice
32 second orifice
33 first spring
34 flange
35 second radial bore
36 tubular portion
40 second control slide valve
43 third orifice
44 fourth orifice
45 second spring (first embodiment)
45' second spring (second embodiment)
46 cavity
47 first radial bore
50 pressure piece
51 control pressure space
52 counter bearing (first embodiment)
52' counter bearing (second embodiment)
53 fluid channel
60 valve housing
61 first housing part
62 second housing part
63 lock nut
64 pressure relief channel
65 actuating channel
66 third radial bore
67 third housing part
71 first fluid flow path
72 second fluid flow path

The invention claimed is:

1. A regulating device for use with a pump that has a hydraulically adjustable displacement volume, the regulating device comprising:
an inflow port;
a return flow port;

an actuating port;
a control port;
a first control slide valve, which is linearly movable with respect to a center axis, the first control slide valve defining a first orifice and a second orifice, the first and second orifices being adjustable jointly and in opposite directions;
a linearly movable second control slide valve, said second control slide valve defining a third orifice and a fourth orifice, the third and fourth orifices being adjustable jointly and in opposite directions;
a fifth orifice; and
a sixth orifice,
wherein the second control slide valve is accommodated in a linearly movable manner within the first control slide valve,
wherein a first fluid flow path runs from the actuating pressure port, via the fifth orifice, onward via a control region, onward via the sixth orifice, to the return flow port,
wherein a second fluid flow path runs from the actuating pressure port, via the second orifice, onward via the control region, onward via the fourth orifice, to the return flow port, and
wherein the control region is formed, at least in some sections, by a cavity within the second control slide valve.

2. The regulating device according to claim 1, wherein:
the regulating device is configured in as a screw-in valve, which is screwable about the center axis into a pump housing,
the first and the second control slide valves are arranged coaxially to the center axis, and
the control port is arranged on an end face of the regulating device that faces in a direction of the center axis.

3. The regulating device according to claim 1, further comprising:
a separate pressure piece, which is configured to be brought into touching contact with the second control slide valve and is movable collinearly with the second control slide valve,
wherein the pressure piece delimits a control pressure space, from which a pressure at the control port is obtained.

4. The regulating device according to claim 3, further comprising:
a second spring arranged in the control pressure space, the second spring being supported against an end surface of the pressure piece.

5. The regulating device according to claim 1, further comprising:
a first housing part, in which the first control slide valve is arranged in a linearly movable manner;
a second housing part, which is screwed into the first housing part in such a way that a relative position between first and second housing parts is adjustable with respect to the center axis; and
a first spring arranged between the first control slide valve and the second housing part.

6. The regulating device according to claim 5, further comprising:
a separate pressure piece, which is configured to be brought into touching contact with the second control slide valve and is movable collinearly with the second control slide valve, wherein the pressure piece delimits a control pressure space, from which a pressure at the control port is obtained,
wherein the pressure piece delimits a control pressure space, from which a pressure at the control port is obtained, and
wherein the pressure piece is accommodated in a linearly movable manner in the second housing part.

7. The regulating device according to claim 1, wherein the control region comprises a cavity in the second control slide valve, and the cavity extends, in a direction of the center axis, at least from the third orifice up to the fourth orifice.

8. The regulating device according to claim 7, wherein the second control slide valve has a plurality of first radial bores, which are a component part of the control region and via which the cavity is fluidically connected to the first control slide valve.

9. The regulating device according to claim 1, wherein the third and the fourth orifices are delimited, in some sections, by the first control side valve in such a way that opening cross section of the third and fourth orifices are dependent on a relative position between the first and the second control slide valve in a direction of the center axis.

10. The regulating device according to claim 1, wherein the first control slide valve has a plurality of second radial bores, wherein at least one second radial bore of the plurality of second radial bores is a component part of the control region.

11. The regulating device according to claim 1, wherein at least one of the fifth orifice and the sixth orifice is arranged in a valve housing, in which the first control slide valve is accommodated in a linearly movable manner.

12. The regulating device according to claim 1, wherein:
a gap is defined between the first control slide valve and a valve housing, the gap extending from an end surface of the first control slide valve that faces in a direction of the center axis up to the first orifice, and
the inflow port is fluidically connected to the gap such that pressure at the inflow port acts on the end surface of the first control slide valve.

13. The regulating device according to claim 1, wherein the control region is delimited, in some sections, respectively, by the first control slide valve, by the second control slide valve, and by a valve housing.

14. A regulating device for use with a pump that has a hydraulically adjustable displacement volume, the regulating device comprising:
an inflow port;
a return flow port;
an actuating port;
a control port;
a first control slide valve, which is linearly movable with respect to a center axis, the first control slide valve defining a first orifice and a second orifice, the first and second orifices being adjustable jointly and in opposite directions; and
a linearly movable second control slide valve, said second control slide valve defining a third orifice and a fourth orifice, the third and fourth orifices being adjustable jointly and in opposite directions,
wherein the second control slide valve is accommodated in a linearly movable manner within the first control slide valve, and
wherein:
the first control slide valve is configured such that a pressure at the inflow port is regulatable to a first predefined value, and/or the second control slide valve is configured such that a difference between the pressure at the inflow port and a pressure at the control port is regulatable to a second predefined value.

\* \* \* \* \*